(12) United States Patent
Park et al.

(10) Patent No.: US 8,934,673 B2
(45) Date of Patent: Jan. 13, 2015

(54) IMAGE PROCESSING METHOD AND APPARATUS FOR DETECTING TARGET

(71) Applicant: LG Innotek Co., Ltd., Seoul (KR)

(72) Inventors: Jung Ah Park, Seoul (KR); Ho Jin Jhee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 136 days.

(21) Appl. No.: 13/655,948

(22) Filed: Oct. 19, 2012

(65) Prior Publication Data

US 2013/0101169 A1    Apr. 25, 2013

(30) Foreign Application Priority Data

Oct. 20, 2011    (KR) .................. 10-2011-0107468

(51) Int. Cl.
*G06K 9/00* (2006.01)
*G06T 7/00* (2006.01)

(52) U.S. Cl.
CPC .......... *G06T 7/0081* (2013.01); *G06K 9/00375* (2013.01); *G06T 2207/10028* (2013.01); *G06T 2207/20144* (2013.01); *G06T 2207/20148* (2013.01); *G06T 2207/30196* (2013.01)
USPC ........................................................ 382/103

(58) Field of Classification Search
None
See application file for complete search history.

(56) References Cited

U.S. PATENT DOCUMENTS

2005/0276446 A1\*   12/2005   Chen et al. ................... 382/103
2007/0031041 A1\*    2/2007   Ko et al. ...................... 382/190
2009/0129679 A1\*    5/2009   Miyamoto .................... 382/190
2010/0111358 A1\*    5/2010   Chai et al. .................... 382/103
2011/0134221 A1     6/2011   Lee et al.
2011/0219340 A1     9/2011   Pathangay et al.
2012/0093360 A1\*    4/2012   Subramanian et al. ....... 382/103

FOREIGN PATENT DOCUMENTS

KR          10-0808543 B1    2/2008
KR       10-2011-0064197 A   6/2011

OTHER PUBLICATIONS

Office Action dated Feb. 28, 2013 in Korean Application No. 10-2011-0107468, filed Oct. 20, 2011.
European Search Report dated Aug. 8, 2014 in European Application No. 12186776.6.
Igorevich, R.R., et al., "Hand gesture recognition algorithm based on grayscale histogram of the image.", 2010.

(Continued)

*Primary Examiner* — Amara Abdi
(74) *Attorney, Agent, or Firm* — Saliwanchik, Lloyd & Eisenschenk

(57) ABSTRACT

An image processing method for detecting a target, includes: an image acquiring unit for acquiring depth information of an image; a histogram creating unit for creating a histogram on the depth information of the image; a critical value setting unit for setting a critical value of the depth information for detecting a region of a detection object from the image; an image processing unit for extracting a region of the detection object from the image by using the set critical value of the depth information; a data verifying unit for verifying whether the extracted region of the detection object corresponds to the target; and a storage unit for storing the extracted region of the detection object. A target is detected based on depth information of an image.

12 Claims, 6 Drawing Sheets

(56) References Cited

OTHER PUBLICATIONS

Wang, Y., et al., "Using Human Body Gestures as Inputs for Gaming via Depth Analysis," pp. 993-996, 2008.

Igorevich, R.R., et al., "Two Hand Gesture Recognition Using Stereo Camera," International *Journal of Computer and Electrical Engineering*, vol. 5, No. 1, Feb. 2013, pp. 69-72.

* cited by examiner (a)

(b)

IMAGE PROCESSING METHOD AND APPARATUS FOR DETECTING TARGET

CROSS-REFERENCE TO RELATED APPLICATION

This application claims the benefit under 35 U.S.C. §119 of Korean Patent Application No. 10-2011-0107468, filed Oct. 20, 2011, which is hereby incorporated by reference in its entirety.

BACKGROUND

The embodiment relates to an image processing method and an image processing apparatus for detecting a target, and more particularly, to a technology for promptly and conveniently extracting a target such as a hand region by using only information of an image depth, and providing a user interface using the extracted hand region.

In recent years, as a utilizing range and a technique level of display devices increase, interactive devices, such as a game player and a computing device, which can detect and reflect an input of a user in real time have been actively developed. For an input of a user, operation recognizing user interface devices capable of recognizing a motion of a user even if the user does not physically make contact with a device have been developed in addition to buttons, keyboards, mouse devices, and touch screens.

Among them, the operation recognizing user interface device capable of recognizing the motion of the user is based on a technology of manipulating functions of a display screen by recognizing initial region and operation of a user using depth information acquired by a 3D sensing camera, and tracing the user from the initial region to recognize a user operation as an input.

In this technology, a part (an elbow, a wrist, or a forearm) of the body of a user is detected by using 3D sensing information to utilize a motion region of the corresponding part in motion recognition. However, as a technology capable of accurately recognizing a motion and a shape of a hand is required to implement a more precise user interface, a method of detecting only a part of a human body as described above is very limited in extraction of a hand region which needs to be primarily extracted for recognition of motion/shape of the hand.

Most of existing methods for extracting the hand region use a 3D image and an RGB color image as input information. However, when both the two pieces of information are utilized, an amount of information to be processed is vast and an algorithm becomes complex, causing an increase in an amount of calculations and a decrease in operation speed. Further, since a body part and a hand region of the user, that is, a region of interest (ROI) cannot be accurately extracted by using RGB color information only, it is essential to utilize depth information to improve accuracy (reference paper: H. An, and D. Kim, "Hand Gesture Recognition using 3D depth Data").

The existing technologies for extracting a hand region have not yet mentioned in detail a method of using only depth information of a stereo camera.

BRIEF SUMMARY

The embodiment provides a technology of extracting a target region, which is a hand region, by using only depth information of an image acquired by a stereo camera and the like to reduce an amount of calculations.

The embodiment also provides a technology of setting a critical value from a distribution map of depth information of an image and separating a target region by using the set critical value to increase an accuracy of extraction of a region and reduce an amount of calculations.

The technical objects to be achieved by the embodiment are not limited to the above-described objects, and other technical objects which have not been mentioned above will be clearly understood by those skilled in the art to which the embodiments suggested in the following description pertain.

According to an embodiment, there is provided an image processing method for detecting a target, including: acquiring depth information of an image; creating a histogram on the depth information of the image; setting a critical value of the depth information for detecting a region of a detection object from the image; extracting a region of the detection object from the image by using the set critical value of the depth information; verifying whether the extracted region of the detection object corresponds to the target; and storing the extracted region of the detection object.

According to another embodiment, there is provided an image processing apparatus for detecting a target, including: an image acquiring unit for acquiring depth information of an image; a histogram creating unit for creating a histogram on the depth information of the image; a critical value setting unit for setting a critical value of the depth information for detecting a region of a detection object from the image; an image processing unit for extracting a region of the detection object from the image by using the set critical value of the depth information; a data verifying unit for verifying whether the extracted region of the detection object corresponds to the target; and a storage unit for storing the extracted region of the detection object.

The embodiment can provide a user interface which can simply and promptly extract a target region such as a hand region and detect a user input based on the extracted target region.

Meanwhile, the other various effects will be directly or implicitly disclosed in the following detailed description of the embodiments.

DETAILED DESCRIPTION

Hereinafter, exemplary embodiments will be described in more detail with reference to accompanying drawings. Meanwhile, a detection object described herein may be a hand region, but may be, for example, a foot, an eye of a person, or a finger which is another object.

Figure 1:
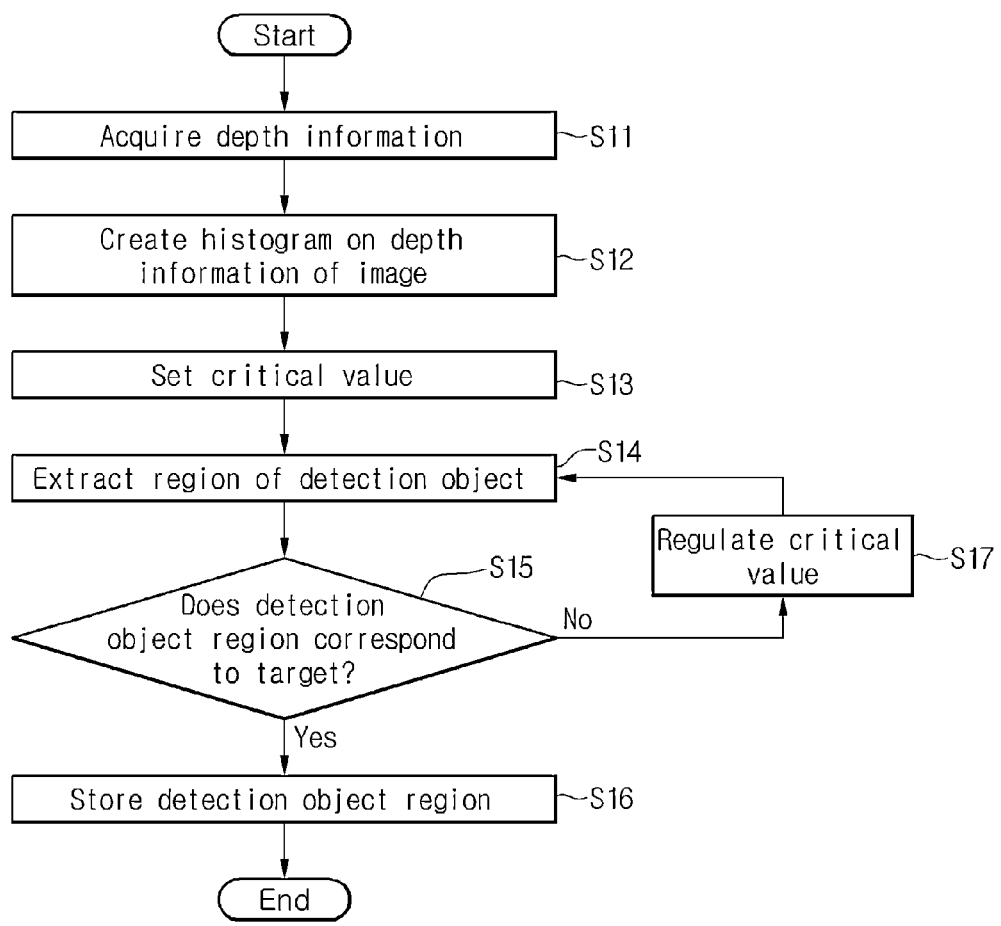
FIG. 1 is a flowchart of an image processing method according to one embodiment.

FIG. 1 is a flowchart of an image processing method according to an embodiment.

In step S11, depth information of an image is acquired. Before the depth information of the image is acquired, an operation of acquiring image information with a stereo camera and acquiring depth information of the image may be preceded.

The depth information of the image corresponds to depth values for a plurality of pixels constituting the image, and the values may be, for example, in a range of 0 to 255.

The acquired image depth information may not be distributed in the entire range of 0 to 255, but may include only values within a predetermined range such as 10 to 200.

In step S12, a histogram on the depth information of the image is created. The histogram may be expressed by a distribution map of pixels on the acquired depth information of the image. For example, the histogram may express the numbers of pixels on the depth information, such as the number of pixels having the depth information 10 is 20, the number of pixels having the depth information 15 is 30, and the like.

As another example, the histogram may express the percentages of pixels on the depth information, such as the percentage of pixels having the depth information 10 is 5%, the percentage of pixels having the depth information 15 is 10%, and the like.

In step S13, a critical value of the depth information is set to detect a region of a detection object to be detected in the image. The region of a detection region may be, for example, a hand region. For example, when the depth information values of the image are ranging from 10 to 200, the critical value may be set to 180 which is 0.9 times the maximum value of 200. That is, the critical value may be set based on a maximum value of the acquired depth information of the image.

As another example, the critical value may be specified as a boundary value for bordering a predetermined value from a distribution range of depth information of an image. For example, when depth information values of an image fall within a range of, for example, 10 to 200, if a boundary value for the distribution of the pixels belonging to 10% from a maximum value of depth information is 175, the boundary value may be specified as a critical value.

In step S14, the region of the detection object is extracted by using the set critical value of the depth information. In extracting the detection object, first, the image may be separated based on the set critical value. For example, when the set critical value is 180, only the pixel region having the depth information not less than the critical value may be extracted. Next, a process such as a morphological transformation may be performed on the separated image to remove noise. Here, the region which has been separated and from which noise has been removed may be at least one candidate region.

The at least one candidate region may be a hand region, and a region having the high possibility to be determined as a hand region finally needs to be detected.

To this end, labeling may be performed on the at least one candidate region. In the labeling, each of the at least one candidate region may be specified as a label, a weight center is specified with reference to a region of the label whose size is largest, and a candidate region farthest from the weight center may be removed or a candidate region close to the weight center may be included in the region including the weight center. Then, the length of a distance for removing the candidate region may be distinguished by a predetermined reference value, and the reference value may be set in advance or may vary according to an experiment example.

Next, a final candidate region is detected from the labeled at least one candidate region. After a noise process is performed on the region remaining after the labeling, a final candidate region which is highly possible to be determined as a hand region is detected.

In step S15, it is verified whether the final candidate region corresponds to the target. That is, it is a process for verifying whether the final candidate region, which has been separated, noise-processed, labeled, and extracted by using the critical value, is a hand region.

In the verification, it may be determined whether a portion of the extracted detection object region corresponds to the target, by comparing a preset region size with a size of the final candidate region. For example, when the target is a hand, the palm of a person may be regarded as to have a predetermined size, and may be finally determined that the detected final candidate region is a hand by setting the size in advance. It is because when the final candidate region is equal to or less than a predetermined region size, for example, when the final candidate region is too small, the critical value needs to be set roughly.

Further, in the verification of the final candidate region, a ratio of the preset target, for example, 1:1.5 may be compared with the final candidate region. It is because when the target is a hand, the palm of a person may have a predetermined range in the ratio of a longitudinal size to a transverse size. When the final candidate region is flat or does not correspond to a ratio where a longitudinal size is slightly longer than a transverse size, a target is not determined and a critical value may be reset.

Here, it is said to be a portion of the extracted detection object region because the detection object region extracted in step S14 may become different in step S15 after noise processing and labeling.

In step S16, when it is determined that the final candidate region corresponds to the target, the final candidate region is stored as the detection object region.

Meanwhile, when it is determined that the detection object region does not correspond to the target in step S15, the critical value is regulated in step S17. For example, when the first critical value is set to be 0.9 times the maximum value of the depth information, the second critical value may be regulated to 0.8 times the maximum value of the depth information. In this case, the detection object region detected in step S15 may become larger than the previous one.

Meanwhile, the regulations of the critical value performed in step S17 may be performed only a predetermined number of times to avoid an infinite loop.

Figure 2:
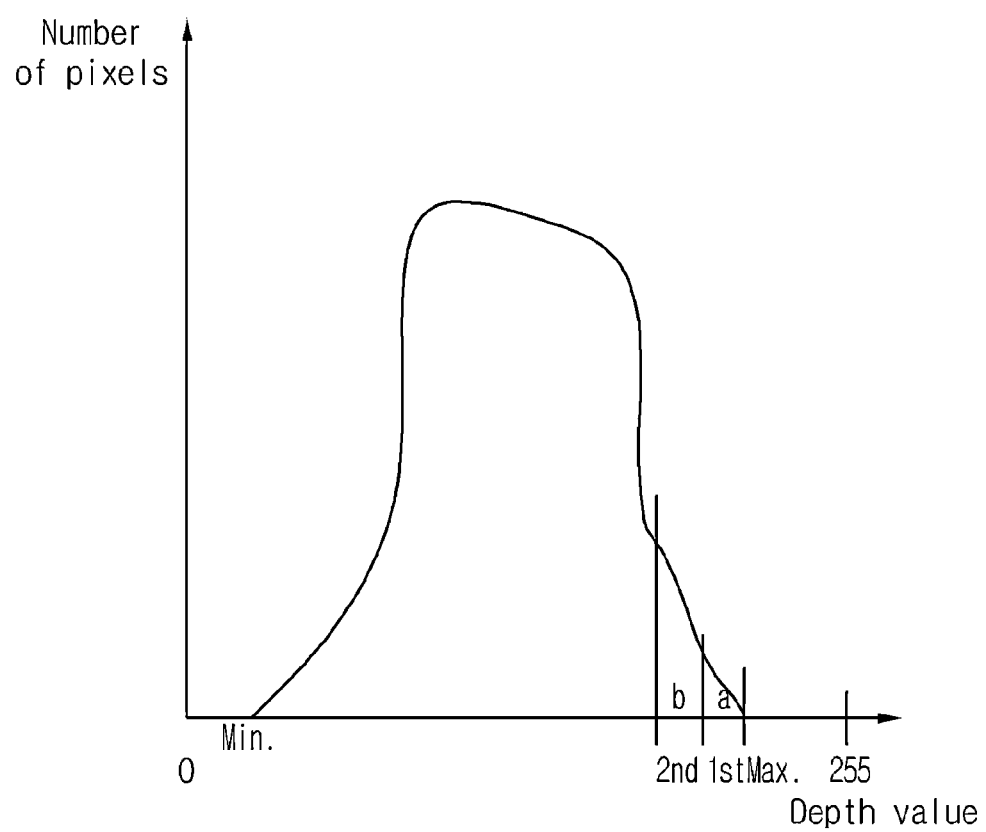
FIG. 2 is an example of a histogram on depth information of an image according to the embodiment.

FIG. 2 is an example of a histogram on depth information of an image according to the embodiment.

Referring to FIG. 2, depth information of an image has a range from a minimum value Min to a maximum value Max, and a histogram is expressed as the number of pixels corresponding to the depth information. As the size of the depth information of the image is large, the subject is located closely, whereas the size thereof is small, the subject is located far away. As illustrated in FIG. 2, the histogram may be expressed by a distribution map of the pixels on the acquired depth information of the image. For example, the histogram may express the numbers of pixels on the depth information, such as the number of pixels having the depth information 10 is 20, the number of pixels having the depth information 15 is 30, and the like. As another example, the histogram may express the percentages of pixels on the depth information, such as the percentage of pixels having the depth information 10 is 5%, the percentage of pixels having the depth information 15 is 10%, and the like.

In the present embodiment, by using the created histogram, as illustrated in FIG. 2, the critical value of the depth information may be set to be the first, the second, and the like to detect a region of the detection object to be detected from the image.

As described above, the critical value may be set based on a maximum value of the acquired depth information of the image, or may be specified as a boundary value bordering a predetermined range from the distribution range of the depth information of the image.

Here, after the detection object region a is detected by using the first critical value set to the first, and when it is determined that the detected region does not correspond to the target, a value set to the second wider than the first is regulated to a second critical value to expand the detection object region to (a+b) region.

Figure 3:
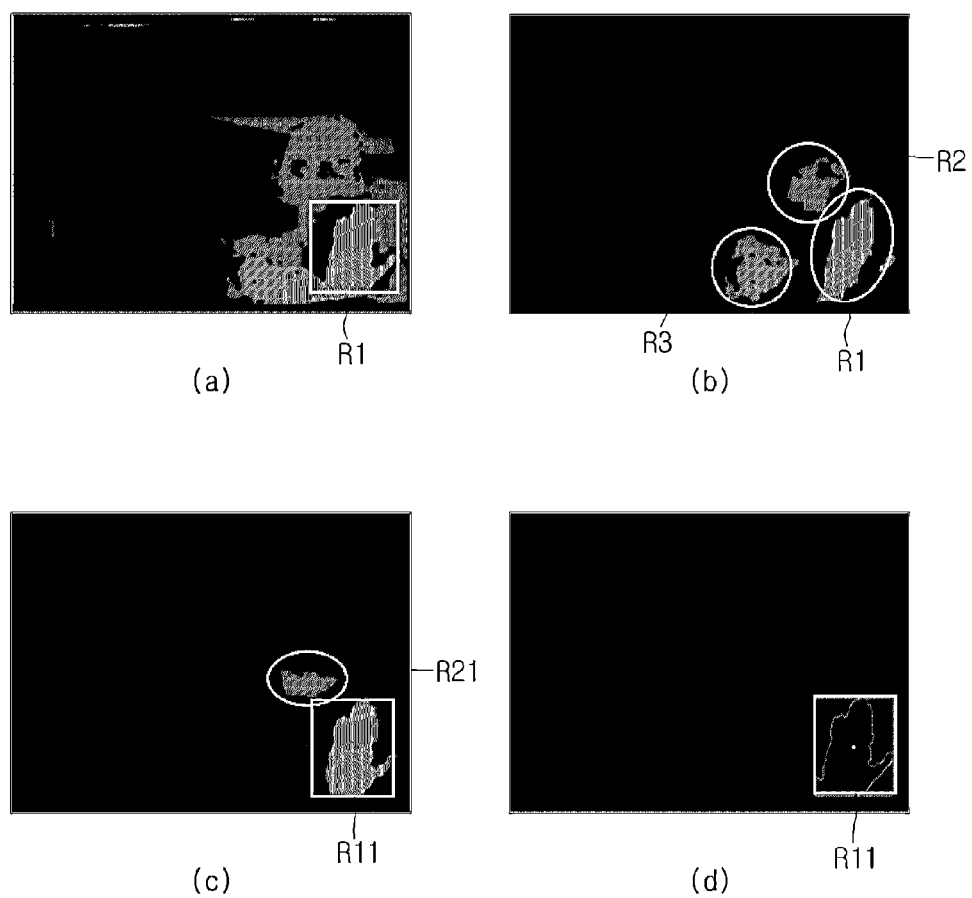
FIG. 3 illustrates an example of image processing for extracting a region of a detection object in the image processing method according to the embodiment.

FIG. 3 illustrates an example of an image processing process for extracting a region of a detection object in the image processing method according to the embodiment.

FIG. 3A shows an image expressed by the depth information. A bright region may represent a close subject, and a dark region may represent a distant subject. Referring to FIG. 3A, an R1 region may be a hand region, and the R1 region needs to be detected and stored as a detection object region in the present embodiment.

FIG. 3B illustrates that a region is separated by using a critical value, and in the process of detecting a detection object region, at least one of candidate regions R1, R2, and R3 is detected. In detail, a region remaining after a region is separated and noise-removed by using a critical value may be detected as at least one candidate region, and in the other regions, the depth information may be processed to '0' and be processed collectively as a dark portion as illustrated in FIG. 3B.

FIG. 3C illustrates an example of detecting a final candidate region R11 and R21 after at least one candidate region is labeled. As illustrated in FIG. 3C, the final candidate region R11 and R21 may be two or more, or may be one.

It is necessary to verify whether the detected final candidate region corresponds to the target with reference to a region size. For example, an area R11 having an area not less than a predetermined size may be detected as the final candidate region by determining whether the region R11 and the region R21 satisfy a size not less than a predetermined size.

FIG. 3D illustrates a region verified as a detection object region. That is, after a critical value is set, a region is separated, noise-removed, labeled, and verified to detect a determined detection object region.

Figure 4:
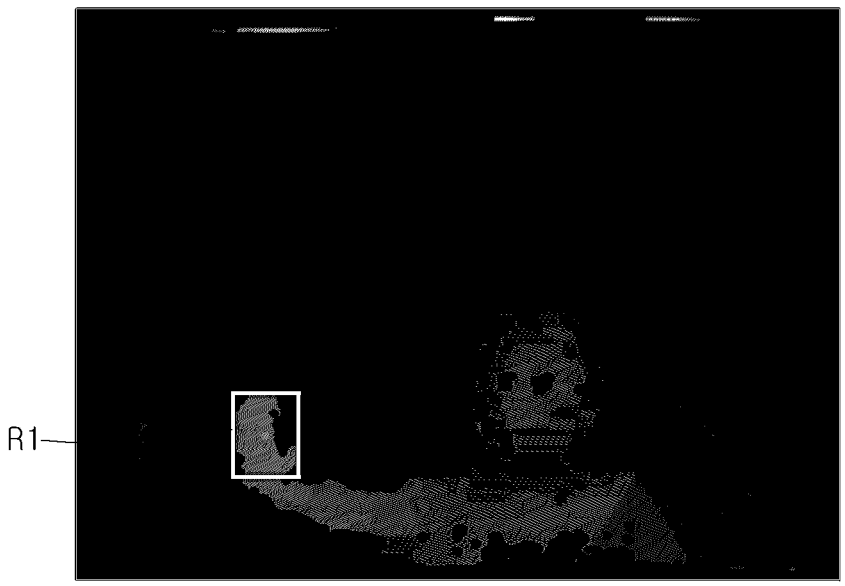
FIG. 4 illustrates another example of image processing for extracting a region of a detection object in the image processing method according to the embodiment.
Figure 4:
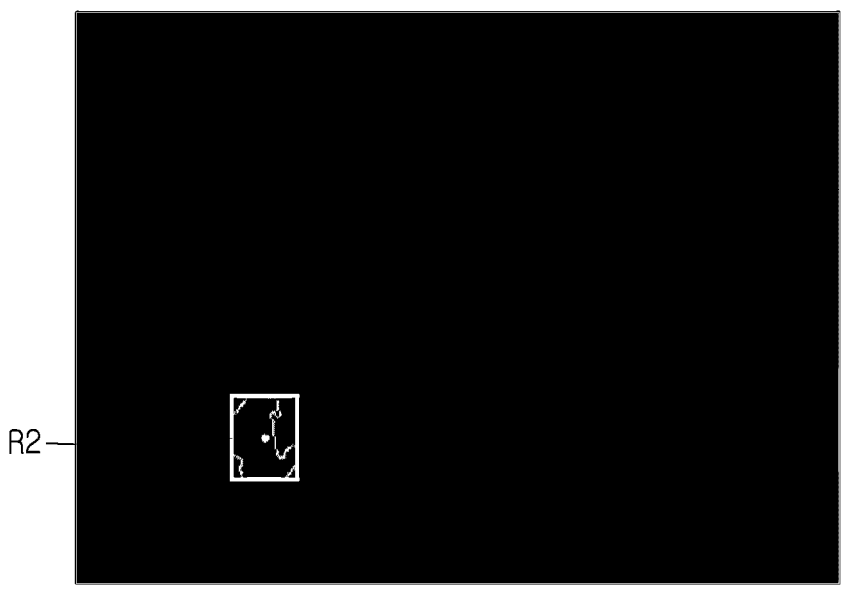

FIG. 4 illustrates another example of an image processing process for extracting a region of the detection object in the image processing method according to the embodiment. FIG. 4 illustrates an example of processing an image where a person stretches out a hand laterally differently from FIG. 3. FIG. 4 illustrates an image expressed as depth information, where the region R1 represents a detection object region. FIG. 4B represents an image where only the detection object region R1 is left as a target and all the remaining regions are collectively processed.

Figure 5:
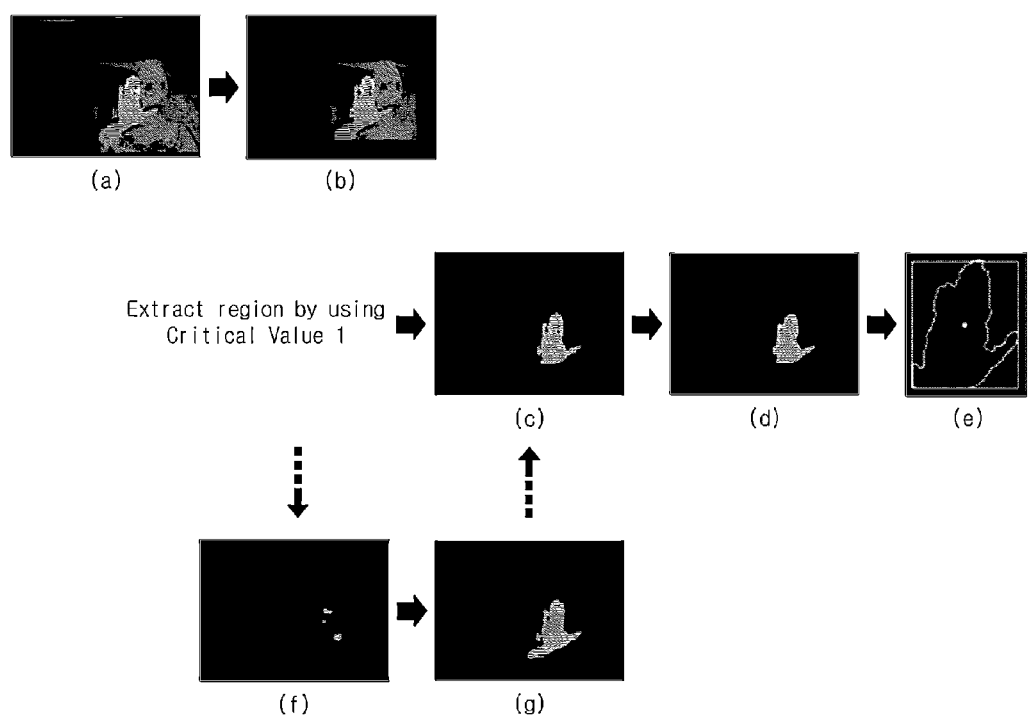
FIG. 5 is a view sequentially illustrating an example of an image processing process for the image processing method according to the embodiment.

FIG. 5 is a view sequentially illustrating an example of an image processing process for the image processing method according to the embodiment.

The depth information of the image is acquired in FIG. 5A, and the image is cropped in FIG. 5B, to remove a peripheral region where a target is expected not to exist. Thereafter, an image is separated in FIG. 5C by using a critical value, and noise is removed and labeling is processed in FIG. 5D to extract a detection object region in FIG. 5E. The detection object is set as a region of interest (ROI) to be utilized in an interface.

Meanwhile, even if an image is separated with an initially set critical value 1, the image may be separated as an image which cannot be verified as a target as illustrated in FIG. 5F. For example, when an image separated by using the critical value 1 is too small in size, or has a ratio or shape which cannot be viewed by a hand region, the image may not be designated as a detection object in the verification of data. In this case, as described above, the critical value is regulated to a critical value 2 again, and the process after FIG. 5C is performed by using the regulated critical value to extract and store a desired detection object region.

Figure 6:
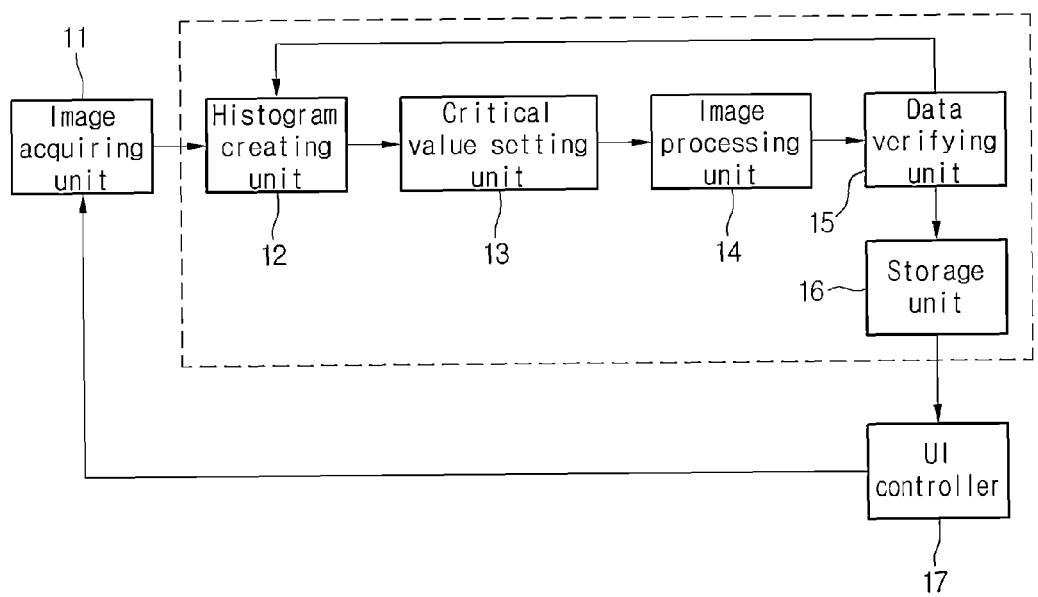
FIG. 6 illustrates a block diagram of an image processing apparatus according to an embodiment.

FIG. 6 illustrates a block diagram of an image processing apparatus according to an embodiment.

Referring to FIG. 6, the image processing apparatus 10 according to the present embodiment includes an image acquiring unit 11 for acquiring depth information of an image, a histogram creating unit 12 for creating a histogram on the depth information of the image, a critical value setting unit 13 for setting a critical value of the depth information for detecting a region of a detection object from the image, an image processing unit 14 for extracting a region of the detection object from the image by using the set critical value of the depth information, a data verifying unit 15 for verifying whether the extracted region of the detection object corresponds to the target, and a storage unit 16 for storing the extracted region of the detection object.

The image acquiring unit 11 may acquire depth information from a 3D image photographed by a stereo camera. The image acquiring unit 11 may include a stereo camera (not illustrated), and/or a memory (not illustrated) for storing an input image and depth information.

The image processing unit 14 may perform a series of operations of separating an image with reference to a set critical value, removing noise from the separated image to detect at least one candidate region, labeling the at least one candidate region, and detecting a final candidate region from the labeled at least one candidate region.

The data verifying unit 15 may regulate the critical value when the extracted detection object region does not correspond to the target. In this case, the image processing unit 14 may extract the detection object region again by using the critical value regulated by the data verifying unit 15, the data verifying unit 15 may verify whether the extracted detection object region corresponds to the target again, and the storage unit 16 may store the extracted detection object region after the verification.

If the detection object is stored, a method of tracing a detection object region for a user interface on an UI controller 17 and interfacing it by using the information may be provided.

Meanwhile, unlike the exemplification of FIG. 6, the histogram creating unit 12, the critical value setting unit 13, the image processing unit 14, the data verifying unit 15, and the storage unit 16 may constitute the image processing unit according to the embodiment, and the image acquiring unit 11 and the UI controller 17 may be configured as independent devices.

The image processing method and the like according to the embodiment have been described above. The image processing method of the embodiment may be applied to a method of tracing a motion of a stored detection object region and for a user interface where motion information is a user input, and may be stored and provided in a recording medium readable by a computer as an electronic recording code.

Further, the image processing apparatus according to the embodiment may be realized as a user interface device such as a computer, a network TV, a game player, a smart TV, and a notebook, or may be mounted and provided thereto.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image processing method for detecting a target, the image processing method comprising:
    acquiring depth information of an image;
    creating a histogram on the depth information of the image;
    setting a critical value of the depth information for detecting a region of a detection object from the image;
    extracting a region of the detection object from the image by using the set critical value of the depth information;
    verifying whether the extracted region of the detection object corresponds to the target;
    storing the extracted region of the detection object; and
    regulating the set critical value when it is determined that the extracted region of the detection object does not correspond to the target,
    wherein the extracting, the verifying, and the storing are repeatedly performed based on the regulated critical value.

2. The image processing method of claim 1, wherein the histogram includes a distribution map of pixels on the acquired depth information of the image.

3. The image processing method of claim 1, wherein the critical value includes a boundary value for bordering a predetermined range from a distribution range of the depth information of the image.

4. The image processing method of claim 1, wherein the critical value is set based on a maximum value of the acquired depth information of the image.

5. The image processing method of claim 1, wherein the extracting of the region of the detection object includes:
    separating the image based on the set critical value;
    removing noise from the separated image to detect at least one candidate region;
    labeling the at least one candidate region; and
    detecting a final candidate region from the labeled candidate region.

6. The image processing method of claim 1, wherein the verifying includes:
    determining whether some of the extracted detection object region corresponds to the target based on a preset region size.

7. An image processing apparatus for detecting a target, the image processing apparatus comprising:
    an image acquiring unit for acquiring depth information of an image;
    a histogram creating unit for creating a histogram on the depth information of the image;
    a critical value setting unit for setting a critical value of the depth information for detecting a region of a detection object from the image;
    an image processing unit for extracting a region of the detection object from the image by using the set critical value of the depth information;
    a data verifying unit for verifying whether the extracted region of the detection object corresponds to the target; and
    a storage unit for storing the extracted region of the detection object;
    wherein the data verifying unit regulates the set critical value when it is determined that the extracted region of the detection object does not correspond to the target; and
    wherein the image processing unit extracts a region of the detection object by using the regulated critical value, the data verifying unit verifies again whether the extracted region of the detection object corresponds to the target, and the storage unit stores the extracted region of the detection object.

8. The image processing apparatus of claim 7, wherein the histogram includes a distribution map of pixels on the acquired depth information of the image.

9. The image processing apparatus of claim 7, wherein the critical value includes a boundary value for bordering a predetermined range from a distribution range of the depth information of the image.

10. The image processing apparatus of claim 7, wherein the critical value is set based on a maximum value of the acquired depth information of the image.

11. The image processing apparatus of claim 7, wherein the image processing unit separates the image based on the set critical value, removes noise from the separated image, detects at least one candidate region, performs labeling on the at least one candidate region, and detects a final candidate region from the labeled at least one candidate region to extract the region of the detection object.

12. The image processing apparatus of claim 7, wherein the data verifying unit determines whether some of the extracted detection object region corresponds to the target based on a preset region size.

* * * * *